(12) United States Patent
James

(10) Patent No.: US 7,516,241 B2
(45) Date of Patent: *Apr. 7, 2009

(54) METHOD AND SYSTEM FOR PROCESSING A SERVICE REQUEST ASSOCIATED WITH A PARTICULAR PRIORITY LEVEL OF SERVICE IN A NETWORK DATA PROCESSING SYSTEM USING PARALLEL PROXIES

(75) Inventor: Zackary Antone James, Franklinton, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/137,244

(22) Filed: Jun. 11, 2008

(65) Prior Publication Data

US 2008/0235396 A1 Sep. 25, 2008

Related U.S. Application Data

(63) Continuation of application No. 10/696,015, filed on Oct. 29, 2003, now Pat. No. 7,447,797.

(51) Int. Cl.
*G06F 15/16* (2006.01)
*G06F 15/173* (2006.01)

(52) U.S. Cl. .................... 709/240; 709/201; 709/224; 709/226; 709/238

(58) Field of Classification Search .................. 709/207, 709/218, 219, 223, 227, 229; 370/229, 352, 370/390
See application file for complete search history.

(56) References Cited

U.S. PATENT DOCUMENTS

| | | | |
|---|---|---|---|
| 6,076,085 A | 6/2000 | Iwata et al. | |
| 6,389,462 B1* | 5/2002 | Cohen et al. | 709/218 |
| 6,490,615 B1* | 12/2002 | Dias et al. | 709/219 |
| 6,571,277 B1 | 5/2003 | Daniels-Barnes et al. | |
| 6,594,671 B1 | 7/2003 | Aman et al. | |
| 7,020,698 B2* | 3/2006 | Andrews et al. | 709/223 |
| 2002/0073167 A1 | 6/2002 | Powell et al. | |
| 2002/0165928 A1 | 11/2002 | Landfeldt et al. | |
| 2003/0033398 A1* | 2/2003 | Carlson et al. | 709/223 |
| 2003/0046412 A1* | 3/2003 | Tsunoda et al. | 709/229 |
| 2003/0053458 A1* | 3/2003 | Okazaki | 370/390 |
| 2003/0065711 A1 | 4/2003 | Acharya et al. | |
| 2003/0097443 A1 | 5/2003 | Gillett et al. | |
| 2003/0112752 A1* | 6/2003 | Irifune et al. | 370/229 |
| 2003/0163569 A1* | 8/2003 | Panasyuk et al. | 709/227 |
| 2004/0032862 A1* | 2/2004 | Schoeneberger et al. | 370/352 |
| 2004/0158615 A1* | 8/2004 | Keller et al. | 709/207 |

FOREIGN PATENT DOCUMENTS

CN 1410895 A 4/2003

* cited by examiner

*Primary Examiner*—Quang N. Nguyen
(74) *Attorney, Agent, or Firm*—Yee & Associates, P.C.; Martin McKinley

(57) ABSTRACT

A proxy server is provided with a plurality of prioritized proxies configured in parallel. The proxy server can include 1-to-n proxy subunits, where "n" can vary depending on the total priority levels available for any given system. Each service (e.g., document-handling) request made to the proxy server is prioritized according to the prioritized proxy subunit that is configured to service the request, which increases the request handling response times for the higher priority requests, and thus, improves the overall performance of the proxy server involved.

16 Claims, 3 Drawing Sheets

METHOD AND SYSTEM FOR PROCESSING A SERVICE REQUEST ASSOCIATED WITH A PARTICULAR PRIORITY LEVEL OF SERVICE IN A NETWORK DATA PROCESSING SYSTEM USING PARALLEL PROXIES

CROSS REFERENCE TO RELATED APPLICATIONS

This application is a continuation of U.S. patent application Ser. No. 10/696,015, filed on Oct. 29, 2003, now U.S. Pat. No. 7,447,797 issued Nov. 4, 2008.

BACKGROUND OF THE INVENTION

1. Technical Field

The invention relates to the network data processing field and, in particular, but not exclusively, to server performance in network data processing systems. Still more particularly, the present invention provides a method and apparatus for improving the performance of proxy servers in network data processing systems.

2. Description of Related Art

A proxy is a server that typically resides between a client's application (e.g., Web browser) and another, "real" server in a network data processing system. A Web browser is a software application that can be used to locate and display documents stored on the World Wide Web ("Web") or the Internet in "Web servers". Web servers can be used to store and disseminate "Web pages". A Web browser (or similar client application) typically runs on a Personal Computer (PC) or workstation, and relies on the real server and/or one or more proxy servers to perform the Web browser's (or client application's) functions, such as, for example, locating and retrieving Web pages for display.

Proxy servers can be used to control access to Internet sites and provide certain Internet services. For example, proxy servers can be used to provide access to the Web or email messaging. A proxy configured to run the known HyperText Transfer Protocol (HTTP) can be used to access the Web, and a proxy configured to run the known Simple Mail Transfer Protocol (SMTP) can be used for sending and receiving email. Also, proxy servers can be used for caching or storing Web pages, so that a subsequent request by a Web browser for a particular Web page can be satisfied locally from the proxy server, instead of routing the request back through the Web.

FIGS. 1A-1B depict a pictorial representation of a conventional, prior art network data processing system. Referring to FIG. 1A, network data processing system 100 contains a PC or workstation 102, which is configured with appropriate software to function as a Web browser within network data processing system 100. As such, browser 102 can be connected via a conventional telecommunication network such as Local Area Network or Wide Area Network (LAN/WAN) 104 to a forward proxy server 106. In the configuration shown, forward proxy server 106 may also be referred to as a "frontend" server, because forward proxy server 106 is located on the frontend or client side of network 108.

As indicated by the dashed outline for forward proxy server 106, network data processing system 100 can be alternatively configured to exclude forward proxy server 106, and browser 102 can be connected directly to network 108 (e.g., via telecommunication network 104). In this regard, a reverse proxy server 110 can be connected to network 108. In the configuration shown, reverse proxy server 110 may also be referred to as a "backend" server, because reverse proxy server 110 is located on the "backend" or server side of network 108. The network configuration of a reverse proxy server as a backend Web server, as shown in FIG. 1A, is often referred to as "intelligent routing" with respect to backend Web servers.

Reverse proxy server 110 is connected to a plurality of processing machines (e.g., 112, 114, 116), which can be configured as servers or processors (e.g., Central Processing Units or CPUs). If browser 102 requests a document (e.g., Web page), the request is communicated to reverse proxy server 110 via networks 104 and 108. Reverse proxy server 110 can then satisfy that request by retrieving the requested document from a processing machine 112, 114 or 116. Reverse proxy server 110 retrieves the requested document by addressing a Uniform Resource Locator (URL) associated with the document request received from browser 102. The URL associated with the document request is addressed to the appropriate machine 112, 114 or 116 where the requested document is stored. In this regard, each such URL can represent the global address of a document or associated processing machine 112, 114, 116 on the Web.

A significant problem that arises with the use of proxy servers in conventional network data processing systems is illustrated by FIG. 1B. Typically, in conventional network data processing systems, one proxy server 110 is connected to a plurality of physical processing machines 112, 114, 116. In order to process the document retrieval requests made by one or more browsers (e.g., 102), proxy server 110 processes each request for service in the order it is received. As shown in FIG. 1B, the response time required for the proxy server 110 to forward these requests for service by the appropriate machine 112, 114 or 116, is the same duration (e.g., 10 ms) for each such request made. In other words, proxy server 110 handles all of the requests on an equal basis. Consequently, in order to improve or decrease the response times for each of the requests, the conventional data processing network solution is to increase the ratio of proxy servers to processing machines (e.g., 3 proxy servers to 3 processing machines) so that each document request may be processed individually. However, this solution is costly in terms of hardware, processing time and money.

Therefore, it would be advantageous to provide an improved method, apparatus and program for increasing the performance of individual proxy servers with respect to the processing of document requests in network data processing systems, such as the Internet. In this regard, the conventional techniques being used to handle network traffic and make intelligent network handling decisions based on traffic content currently require the use of processing capabilities that impact the overall performance of the proxy servers involved. Consequently, there is a need to develop software solutions that can leverage the use of unique server designs in order to improve the performance of these proxy servers.

SUMMARY OF THE INVENTION

The present invention provides a plurality of prioritized proxies for processing service requests. In a preferred embodiment, a reverse proxy server is provided that can include 1-to-n proxy subunits configured in parallel, where "n" can vary depending on the total priority levels available for any given system. Each service (e.g., document-handling) request made to the proxy server is prioritized according to the prioritized proxy subunit that is configured to service the request. This prioritized proxy servers scheme increases the request handling response time for those requests being serviced by the higher priority proxy subunits, and decreases the response time for those requests being serviced by the lower priority proxy subunits. In this manner, the proxy server can significantly improve its overall request handling performance as compared to conventional proxy server request handling techniques.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
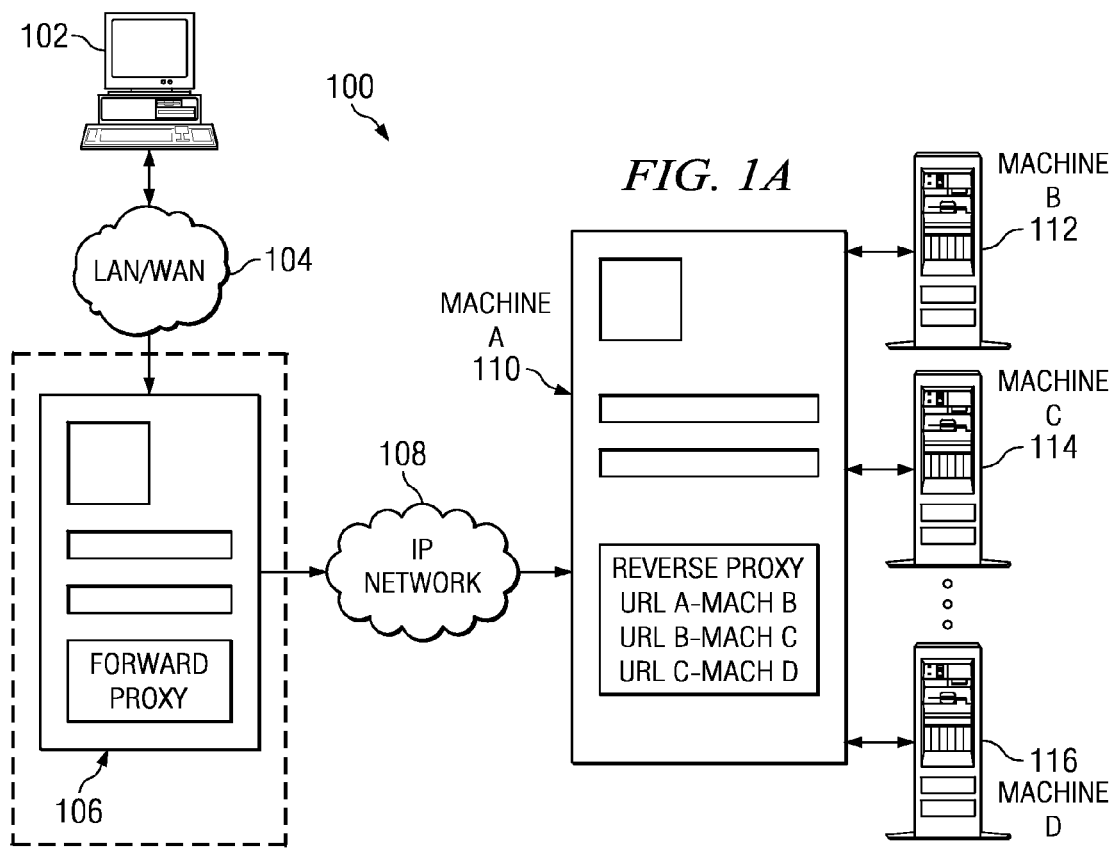
FIGS. 1A-1B are related drawings that depict a pictorial representation of a conventional, prior art network data processing system.
Figure 1B:
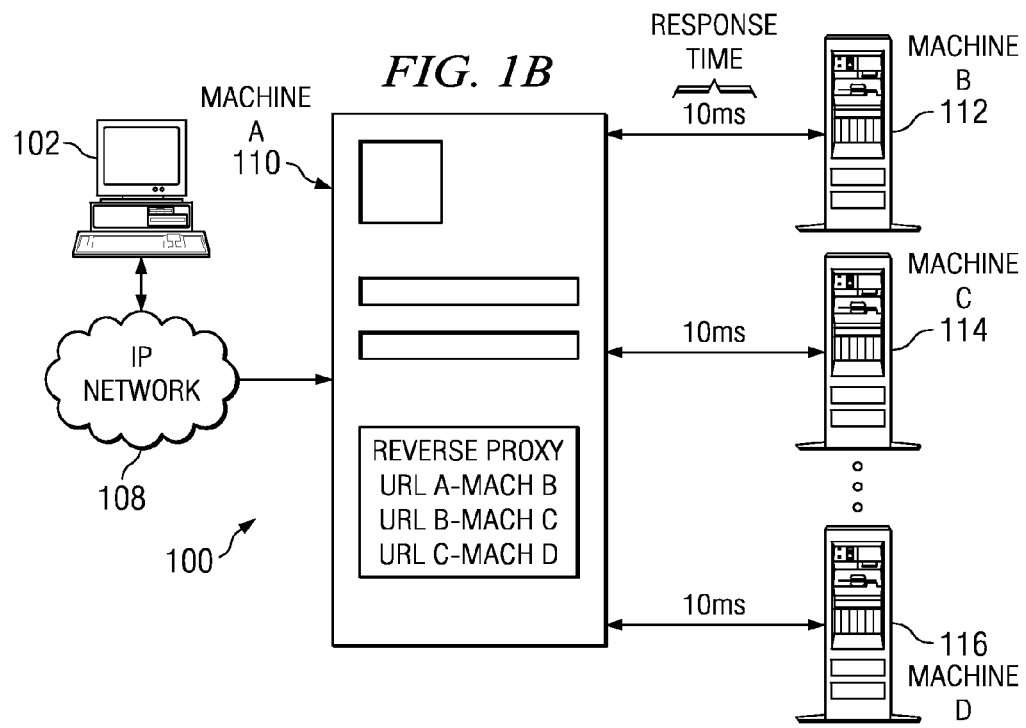
Figure 2A:
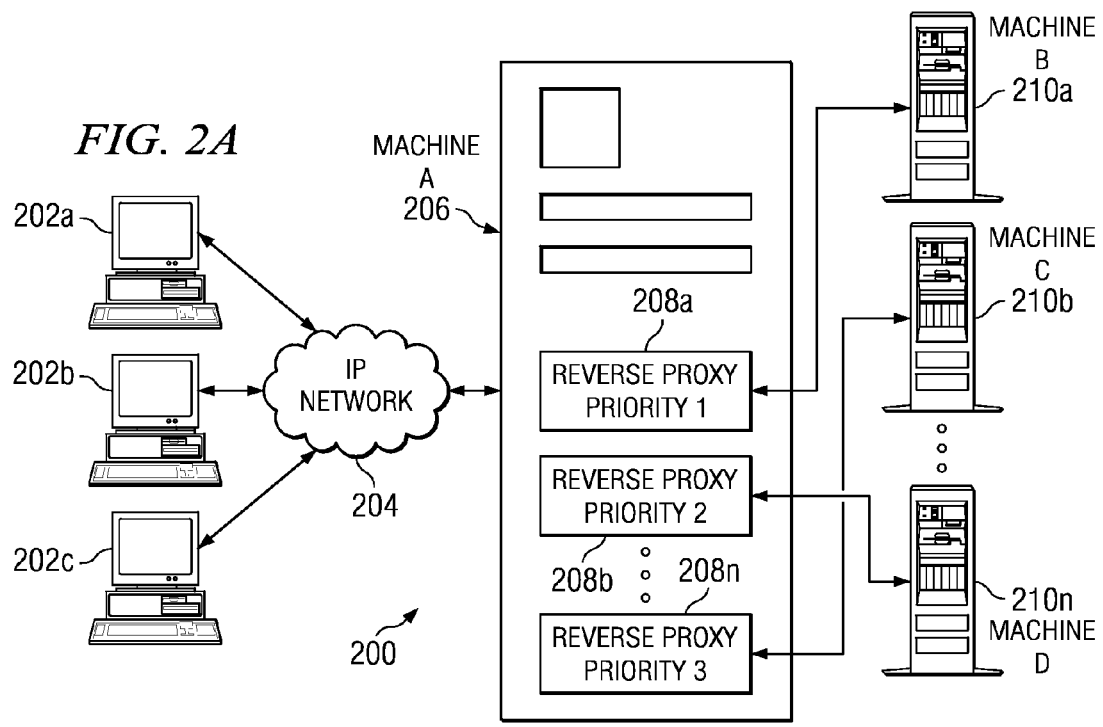
FIGS. 2A-2B are related drawings that depict a pictorial representation of a network data processing system in which the present invention may be implemented.
Figure 2B:
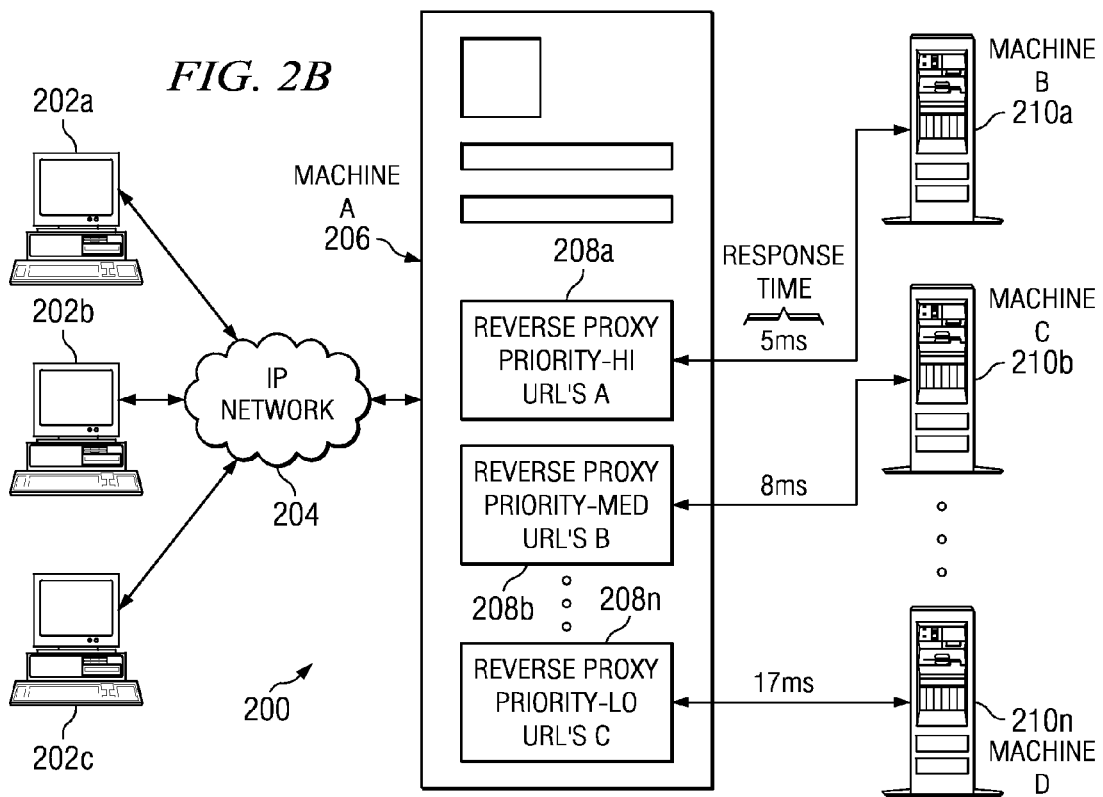

With reference now to the figures, FIGS. 2A-2B depict a pictorial representation of a network data processing system in which the present invention may be implemented. Network data processing system 200 is a network of computers, processors or servers in which the present invention may be implemented. Referring to FIG. 2A, network data processing system 200 includes a plurality of client processors 202a-202c, each of which can be a PC, workstation, server or other appropriate, digital processing machine.

In an exemplary embodiment, each client processor 202a-202c is configured with appropriate software to function as a Web browser within network data processing system 200. For example, each client processor 202a-202c may be configured to function as a Web browser with such known browser software as Internet Explorer® or Netscape Navigator® running under an appropriate Operating System (OS), such as a Microsoft Windows® OS.

In this exemplary embodiment, each browser 202a-202c can be connected to a network 204, which is a medium used to provide communication links between various devices and computers connected together within network data processing system 200. Network 204 may include connections, such as wire, wireless communication links, or fiber optic cables. In the depicted example, network data processing system 200 is the Internet with network 204 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, including thousands of commercial, government, educational and other computer systems that route data and messages. Of course, network data processing system 200 also may be implemented as a number of different types of networks, such as for example, an intranet, a local area network (LAN), or a wide area network (WAN). Also, network data processing system 200 may include additional servers, clients, and other devices not shown. FIG. 2A is intended as an example, and not as an architectural limitation for the present invention.

For this exemplary embodiment, a proxy server 206 is preferably configured as a reverse proxy server and connected to network 204 on the backend side of network 204. Proxy server 206 includes a plurality of proxy subunits 208a-208n. Each proxy subunit of the plurality of proxy subunits 208a-208n can be implemented with hardware and/or software to function as a separate proxy for receiving and processing requests (e.g., for documents) made by one or more browsers of the plurality of client processors or browsers 202a-202c. Each proxy subunit 208a-208n can be assigned a relative priority for processing such received requests.

For this exemplary embodiment, each of proxy subunits 208a-208n can be connected to, and request documents or services from, a corresponding processing machine 210a-210n based on software configuration. For example, with n equal to 3, each proxy subunit 208a-208c is configured to send requests to a corresponding processing machine 210a-210c. Each of processing machines 210a-210n may be, for example, a server, network computer or PC.

Preferably, the level of priority assigned to a particular proxy subunit 208a-208n is associated with the particular processing machine 210a-210n configured to that proxy subunit 208a-208n. For example, as shown in FIG. 2A, a priority level of "1" can be assigned to proxy subunit 208a for requests to be serviced by processing machine 210a, a priority level of "2" can be assigned to proxy subunit 208b for requests to be serviced by processing machine 210c, and a priority level of "3" can be assigned to proxy subunit 208c for requests to be serviced by processing machine 210b.

In operation, for this exemplary embodiment, it may be assumed that one of the browsers 202a-202c (e.g., browser 202a) transmits a document request (e.g., for a Web page). The document request can be communicated to proxy server 206 by network 204. Each proxy subunit 208a-208n is functionally capable of satisfying such a request and retrieving the requested document from a particular processing machine 210a-210n. As such, a specific proxy subunit 208a-208n is assigned to satisfy that request by addressing a URL received from the browser (e.g., 202a). The URL is associated with a particular processing machine 210a-210n in which the requested document is stored. For this exemplary embodiment, the URL can represent the global address on the Web of the requested document, or the global address of the processing machine 210a-210n in which that document is stored.

Referring now to FIG. 2B, for this exemplary embodiment, it may be assumed that the URL or document request received at proxy server 206 from the browser (e.g., 202a) is for a document stored in processing machine 210a. Also, it may be assumed that a priority level assigned to all document requests destined for processing machine 210a, which requests are to be processed by proxy subunit 208a, is a "high" priority relative to the priorities assigned to the other proxy subunits (e.g., 208b-208n). As shown in FIG. 2B, the received document requests with URLs destined for processing machine 210a, which are to be handled by the "high" priority proxy subunit 208a, are serviced by proxy subunit 208a with the fastest response time (e.g., 5 ms). Similarly, the received document requests with URLs destined for processing machine 210b, which are to be handled by the "medium" priority proxy subunit 208b, are serviced by proxy subunit 208b with the second fastest response time (e.g., 8 ms), and the received document requests with URLs destined for processing machine 210n, which are to be handled by the "low" priority proxy subunit 208n, are serviced by proxy subunit 208n with the slowest response time (e.g., 17 ms).

In the above-described manner, the present invention increases the document request handling response time for higher priority processing resources, and decreases the document handling response time for lower priority processing resources. Thus, the proxy server is free to handle the distribution of a relatively large number of service requests. Also, the use of a plurality of parallel, prioritized proxies contained in an individual proxy server alleviates the bottlenecks that previously occurred during the handling of service requests by conventional proxy servers. As such, the present invention significantly improves the overall service request handling performance of a proxy server in a network data processing system (e.g., the Internet), as compared to conventional proxy server request handling techniques.

Advantageously, the present invention gives network data processing system designers greater control over the configuration of proxy servers, which allows network system administrators to configure a plurality of functional proxies on individual proxy server machines. As a result, the system administrators can prioritize the multiple, functional proxies to maximize proxy server performance, and also make informed decisions about the routing of traffic between multiple proxies, the proxy server, and the target processing machines. These decisions can be based on such network design and administrative factors as traffic content, the length of the content, the type of service request being made of the proxy server, the source and/or client applications that have made such requests, and the target processors that are destined to service such requests. Also, in accordance with the present invention, the improved design capability of encapsulating networking functions on a per-proxy, functional basis improves system administrators' control over important functional components such as auditing and security, by enabling each proxy to provide a functional specialization.

Those of ordinary skill in the art will appreciate that the hardware depicted in FIGS. 2A-2B may vary. For example, other servers or similar processors, such as forward servers and the like, also may be used in addition to or in place of the hardware depicted. The depicted example is not meant to imply architectural limitations with respect to the present invention.

Figure 3:
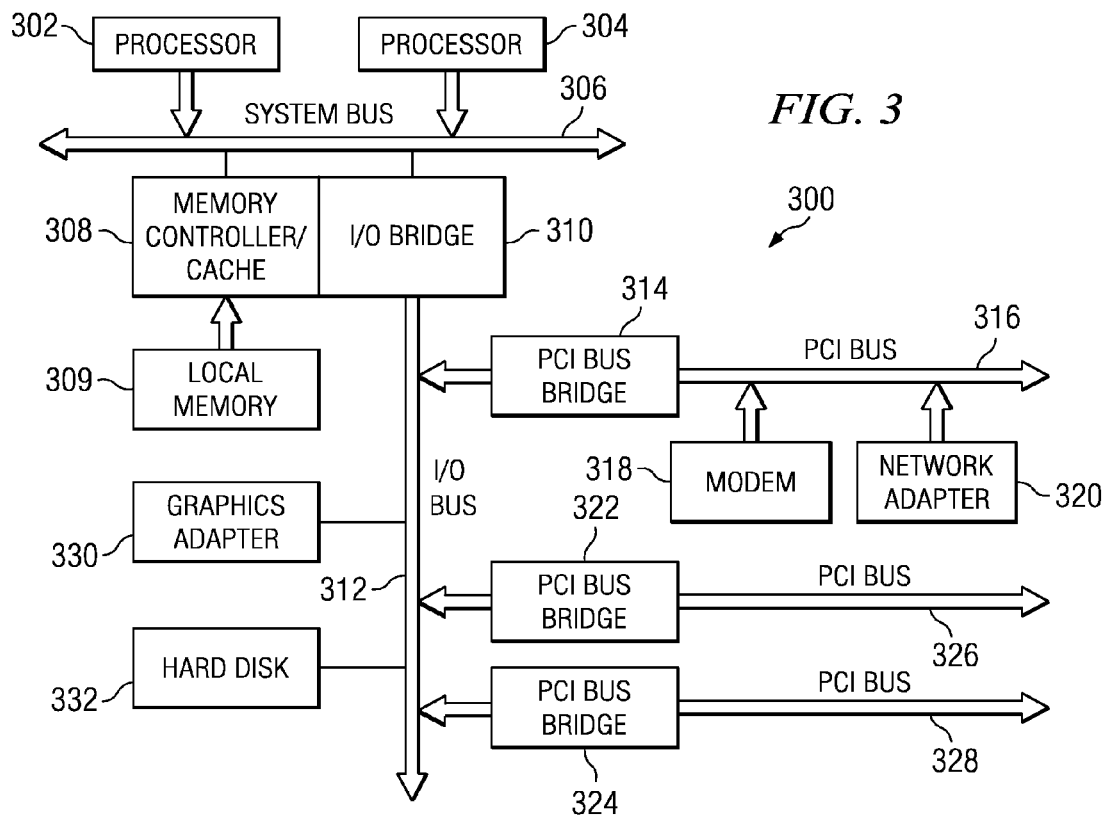
FIG. 3 depicts a block diagram of a data processing system that may be implemented as a server, such as proxy server 206 in FIGS. 2A-2B, in accordance with a preferred embodiment of the present invention.

Referring to FIG. 3, a block diagram of a data processing system that may be implemented as a server, such as proxy server 206 in FIGS. 2A-2B, is depicted in accordance with a preferred embodiment of the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. An I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI local bus 316. Typical PCI bus implementations will support four PCI expansion slots or add-in connectors. Communication links to client processors (e.g., browsers) 202a-202c in FIGS. 2A-2B may be provided through modem 318 and network adapter 320 connected to PCI local bus 316 through add-in boards.

Additional PCI bus bridges 322 and 324 provide interfaces for additional PCI local buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM eServer pSeries system, a product of International Business Machines Corporation in Armonk, N.Y., running the Advanced Interactive Executive (AIX) operating system or LINUX operating system.

Figure 4:
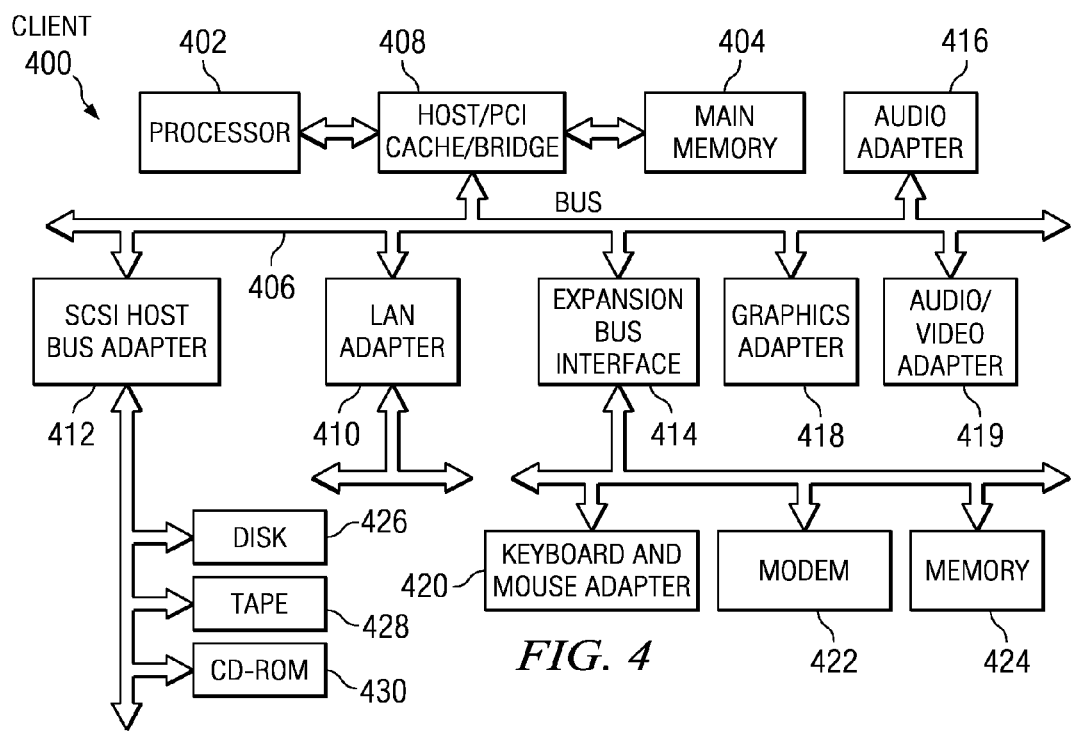
FIG. 4 depicts a block diagram of a data processing system that may be implemented as a client processor or browser, such as, for example, a client processor and/or browser 202a-202c in FIGS. 2A-2B, in accordance with a preferred embodiment of the present invention.

With reference now to FIG. 4, a block diagram illustrating a data processing system is depicted in which the present invention may be implemented. Data processing system 400 is an example of a client processor, such as, for example, a client processor and/or browser 202a-202c in FIGS. 2A-2B. Data processing system 400 employs a peripheral component interconnect (PCI) local bus architecture. Although the depicted example employs a PCI bus, other bus architectures such as Accelerated Graphics Port (AGP) and Industry Standard Architecture (ISA) may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. Small computer system interface (SCSI) host bus adapter 412 provides a connection for hard disk drive 426, tape drive 428, and CD-ROM drive 430.

An OS runs on processor 402 and is used to coordinate and provide control of various components within data processing system 400 in FIG. 4. The OS may be a commercially available OS, such as Windows XP, which is available from Microsoft Corporation. A browser-oriented programming system such as Microsoft's Internet Explorer® or Netscape's Navigator® may run in conjunction with the OS and provide calls to the OS from programs or applications executing on data processing system 400. Instructions for the OS, the browser-oriented programming system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash read-only memory (ROM), equivalent nonvolatile memory, or optical disk drives and the like, may be used in addition to or in place of the hardware depicted in FIG. 4. Also, the processes of the present invention may be applied to a multiprocessor data processing system. Also, data processing system 400 configured as a client processor and/or browser may relatively simply be a computer including a CPU, display monitor, and associated I/O and peripheral devices. As such, the depicted example in FIG. 4 and above-described examples are not meant to imply architectural limitations. For example, data processing system 400 also may be a notebook computer or hand-held computer in the form of a Personal Digital Assistant (PDA). Also, for example, data processing system 400 may be a kiosk, Web appliance, or Wireless-Fidelity (Wi-Fi) device.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A network data processing system, comprising:
    a first processing unit, said first processing unit including a plurality of processing subunits, each processing subunit of said plurality of processing subunits associated with a particular priority level of service of a plurality of priority levels of service, wherein said first processing unit is a proxy server; and
    a plurality of second processing units, each processing subunit of said plurality of processing subunits coupled to a corresponding second processing unit of said plurality of second processing units and operable to:
    responsive to the proxy server receiving a service request, convey said service request to said corresponding second processing unit in accordance with said associated priority level of service;
    wherein each processing subunit of said plurality of processing subunits is configured to receive service requests from the proxy server and is configured to send the received service requests to the corresponding second processing unit of said plurality of second processing units, and
    wherein said processing subunit associated with a higher priority level of service comprises a faster response time than said processing subunit associated with a lower priority level of service.

2. The network data processing system of claim 1, further comprising:
    a plurality of third processing units; and
    a network communication medium coupled to said plurality of third processing units and said first processing unit, whereby at least one of said third processing units of said plurality of said third processing units is operable to convey said service request to said first processing unit.

3. The network data processing system of claim 2, wherein each said third processing unit of said plurality of third processing units comprises a client processor.

4. The network data processing system of claim 2, wherein each said third processing unit of said plurality of third processing units comprises a Web browser.

5. The network data processing system of claim 2, wherein said network communication medium comprises an IP network.

6. The network data processing system of claim 2, wherein said network communication medium comprises at least one of an intranet, LAN and WAN.

7. The network data processing system of claim 1, wherein said first processing unit comprises a reverse proxy server.

8. The network data processing system of claim 1, wherein each said processing subunit of said plurality of processing subunits comprises a proxy subunit.

9. The network data processing system of claim 1, wherein each said second processing unit of said plurality of second processing units comprises a document storage processor.

10. The network data processing system of claim 1, wherein said service request comprises a request to retrieve a document from a Web page.

11. The network data processing system of claim 1, wherein said particular priority level of service comprises a high level of priority.

12. The network data processing system of claim 1, wherein said particular priority level of service comprises a medium level of priority.

13. The network data processing system of claim 1, wherein said particular priority level of service comprises a low priority of service.

14. The network data processing system of claim 1, wherein said association with said particular priority level of service comprises a global address of at least one of a document residing on a Web page and said second processing unit of said plurality of second processing units.

15. The network data processing system of claim 14, wherein said association comprises a URL.

16. A computer program product embedded on a computer-readable storage medium having computer usable program code, executable for processing a service request in a network data processing system, the computer program product comprising:
    first instructions for receiving a service request at a first processing unit said first processing unit including a plurality of processing subunits, each processing subunit of said plurality of processing subunits associated with each particular priority level of service of a plurality of priority levels of service, wherein said first processing unit is a proxy server;
    second instructions for associating a particular priority level of service with said service request;
    third instructions for conveying said service request to a corresponding second processing unit of a plurality of second processing units in accordance with said particular priority level of service; and
    fourth instructions for processing said service request at the corresponding second processing unit in accordance with said particular priority level of service;

wherein each processing subunit of said plurality of processing subunits is configured to receive service requests from the proxy server and is configured to send the received service requests to the corresponding second processing unit of said plurality of second processing units, and wherein said processing subunit associated with a higher priority level of service comprises a faster response time than said processing subunit associated with a lower priority level of service.

* * * * *